(No Model.) 6 Sheets—Sheet 1.
R. H. INGERSOLL.
MACHINE FOR DRAWING IN WARP THREADS.
No. 468,914. Patented Feb. 16, 1892.
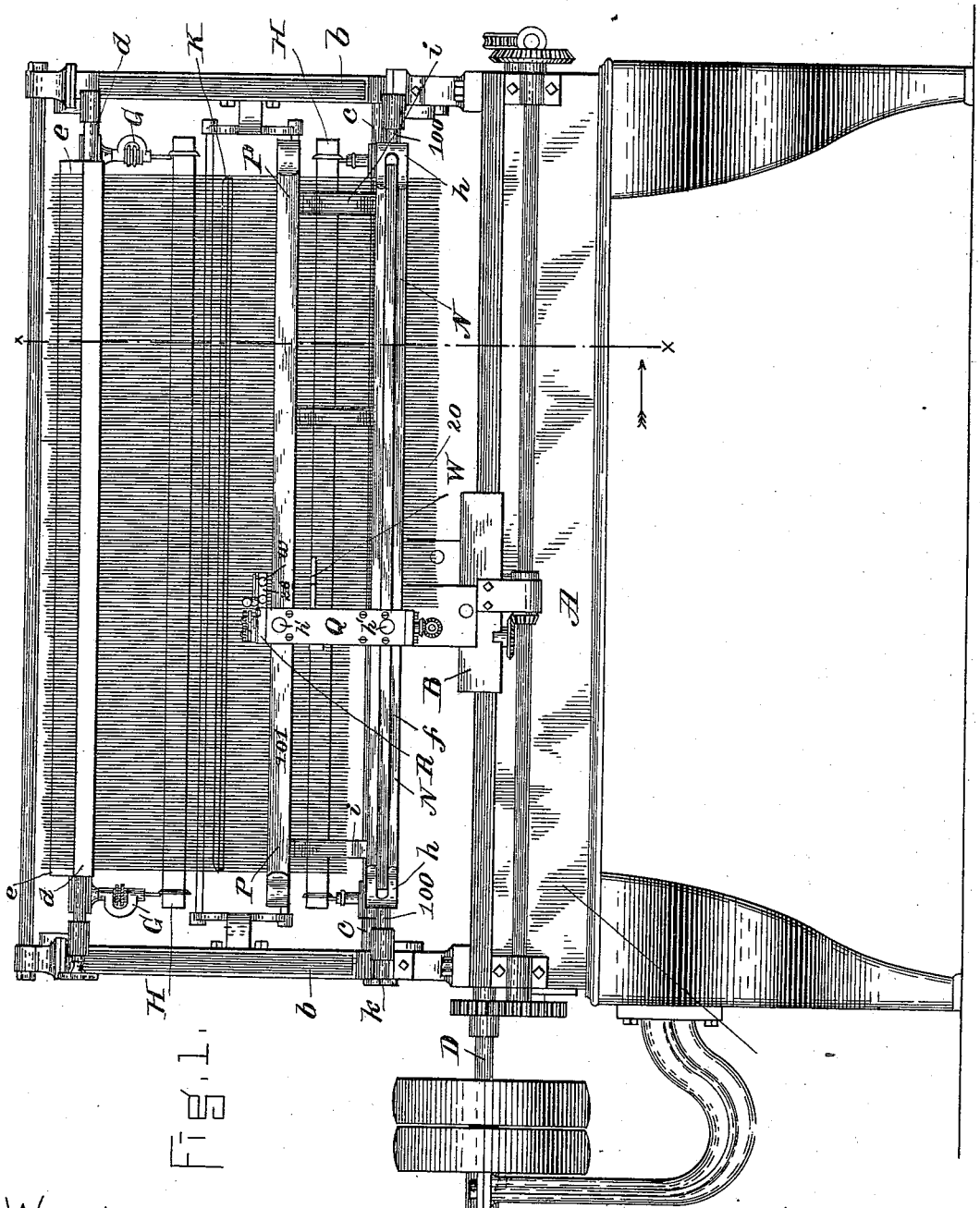
Witnesses
Henry Marsh
Harry H. Aiken
Inventor
Richmond H. Ingersoll.
by Teschemacher Atty.

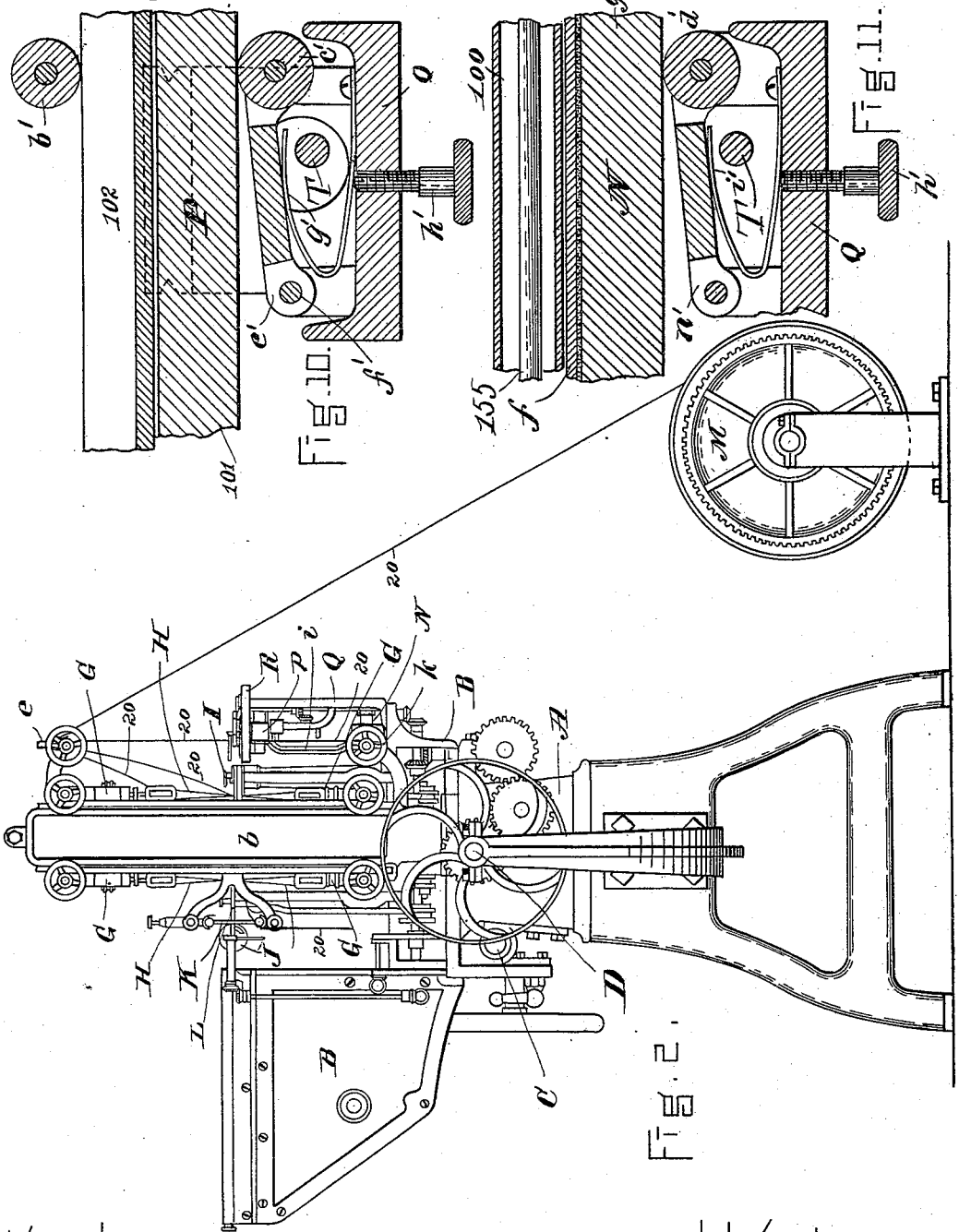

(No Model.) 6 Sheets—Sheet 3.
R. H. INGERSOLL.
MACHINE FOR DRAWING IN WARP THREADS.
No. 468,914. Patented Feb. 16, 1892.
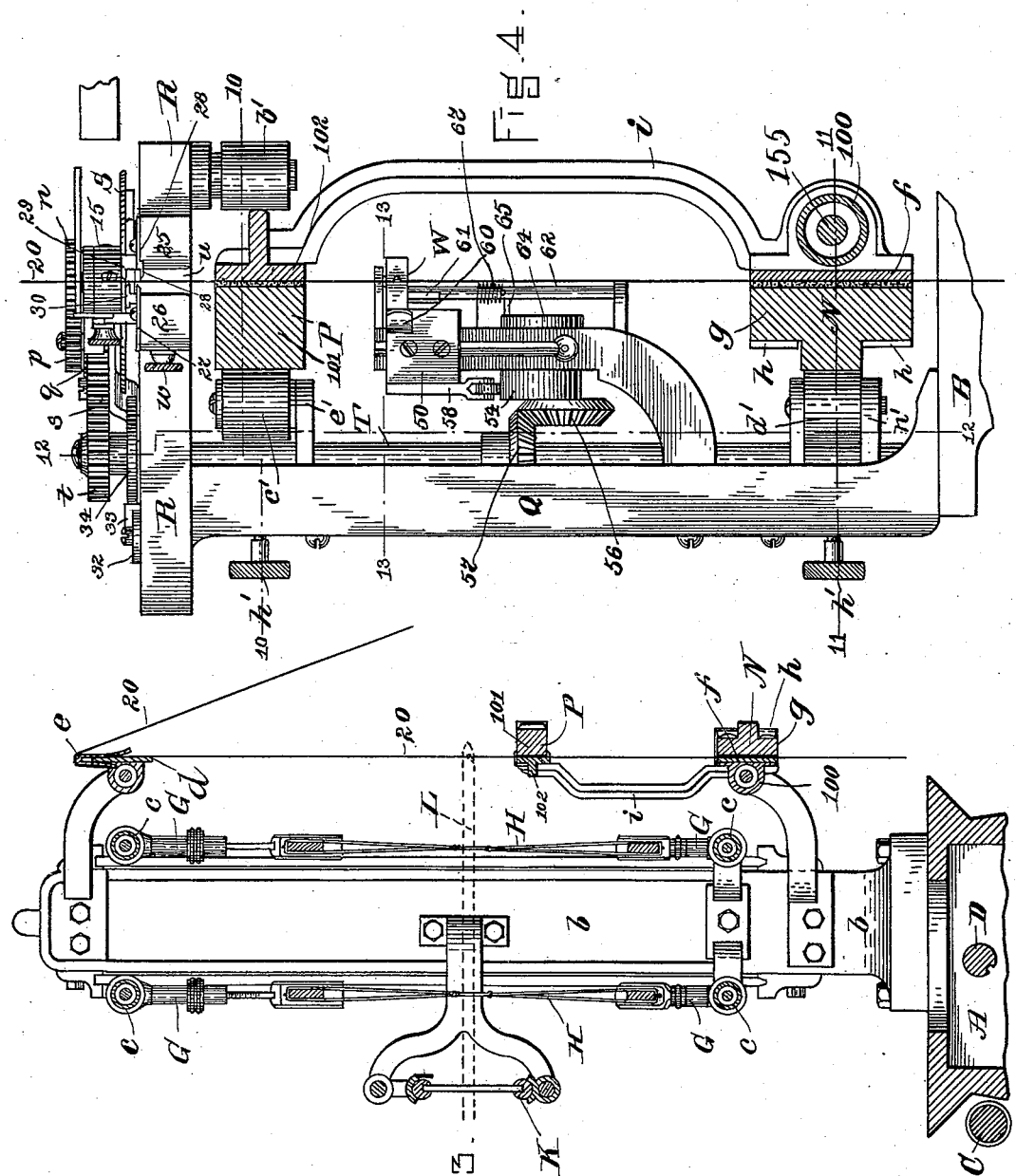
Witnesses.
Inventor.
Richmond H. Ingersoll,
by Teschemacher Atty.

(No Model.) 6 Sheets—Sheet 4.
R. H. INGERSOLL.
MACHINE FOR DRAWING IN WARP THREADS.
No. 468,914. Patented Feb. 16, 1892.
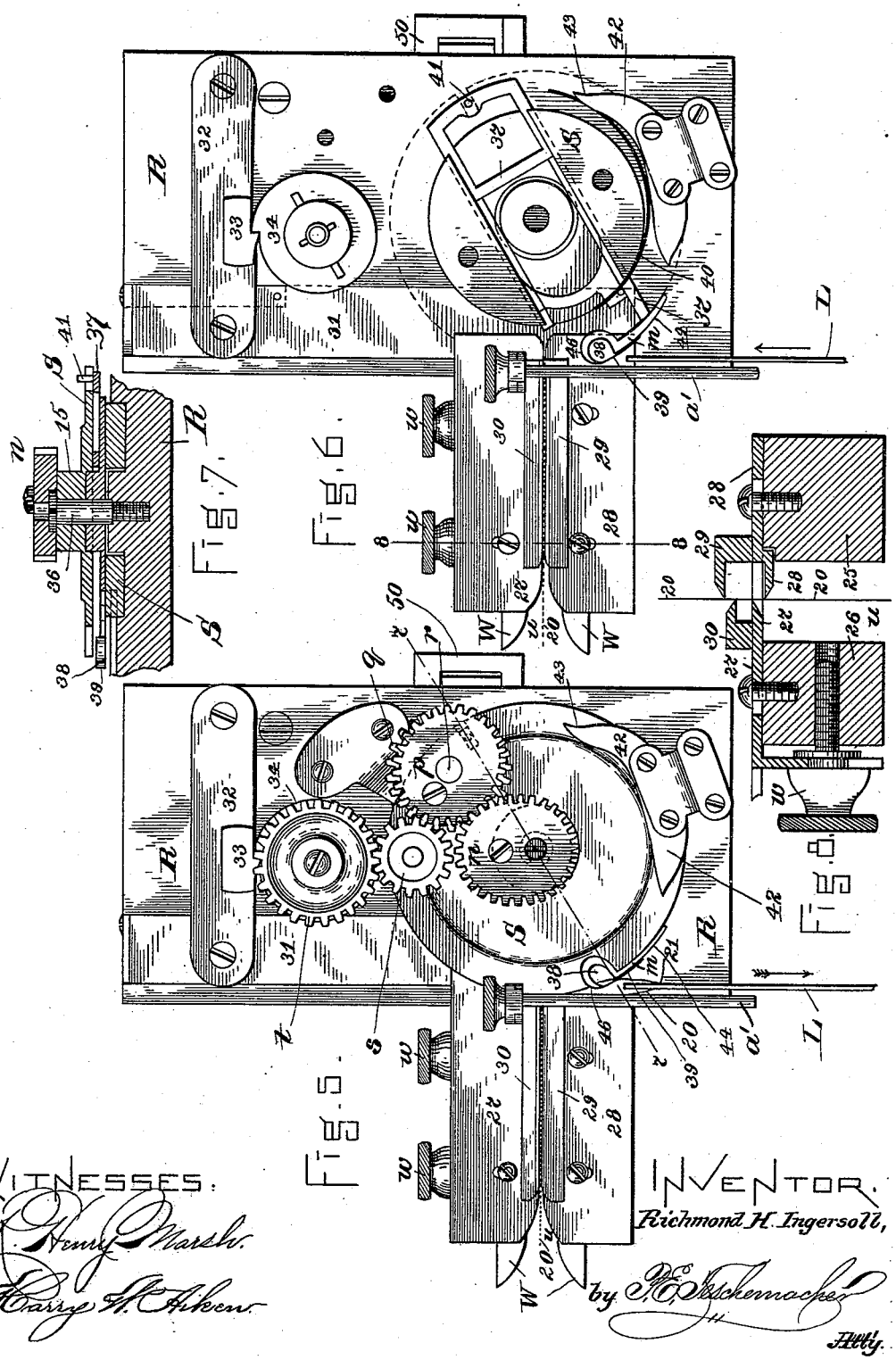
WITNESSES:
Henry Marsh.
Harry W. Aiken.
INVENTOR.
Richmond H. Ingersoll,
by Teschemacher
Atty.

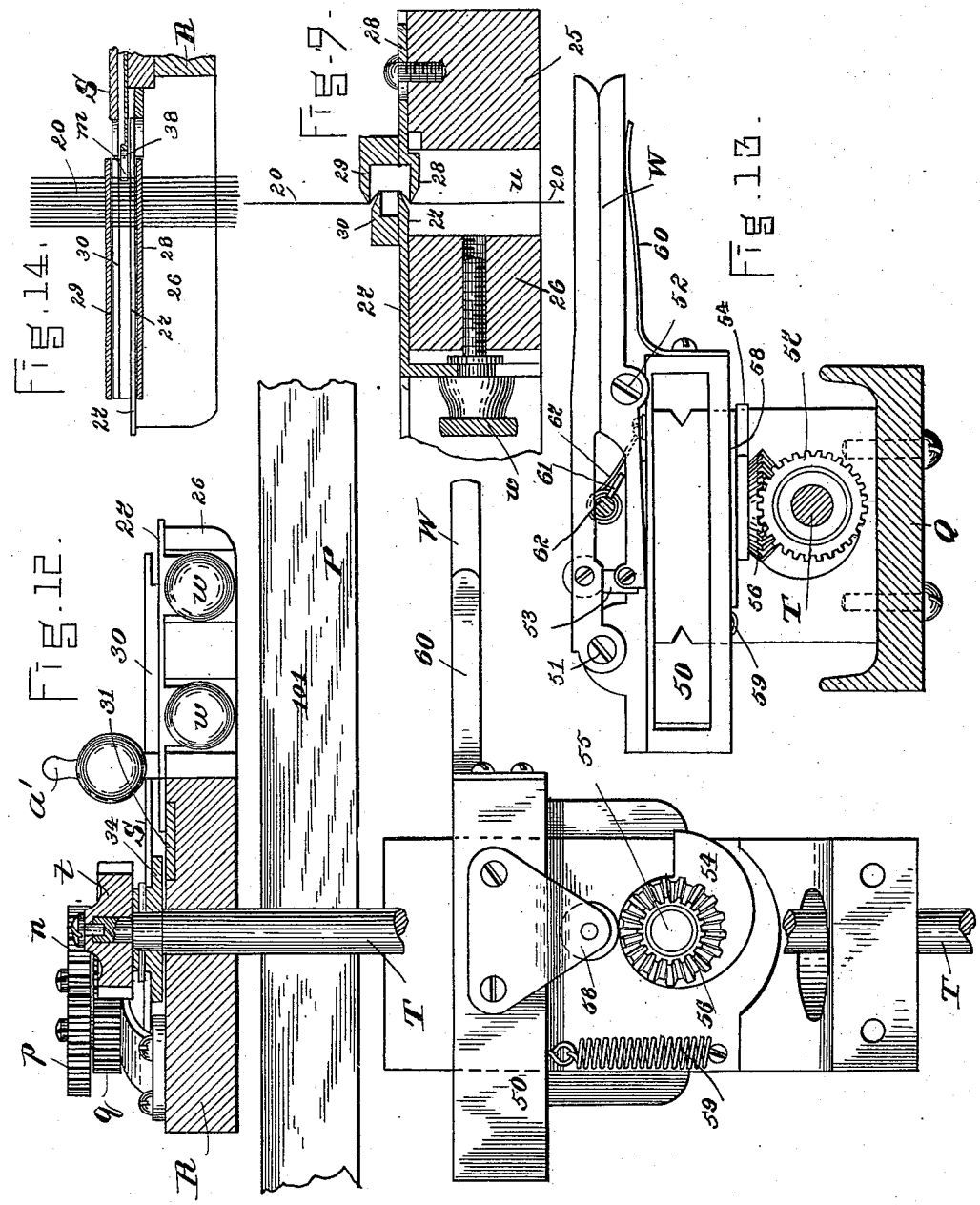

(No Model.) 6 Sheets—Sheet 6.

R. H. INGERSOLL.
MACHINE FOR DRAWING IN WARP THREADS.

No. 468,914. Patented Feb. 16, 1892.

Witnesses
Henry Marsh.
Harry W. Aiken.

Inventor.
Richmond H. Ingersoll.
by T. E. Teschemacher
Atty.

UNITED STATES PATENT OFFICE.

RICHMOND H. INGERSOLL, OF BIDDEFORD, MAINE.

MACHINE FOR DRAWING IN WARP-THREADS.

SPECIFICATION forming part of Letters Patent No. 468,914, dated February 16, 1892.

Application filed March 3, 1891. Serial No. 383,616. (No model.)

*To all whom it may concern:*

Be it known that I, RICHMOND H. INGERSOLL, a citizen of the United States, residing at Biddeford, in the county of York and State of Maine, have invented certain Improvements in Machines for Drawing in Warp-Threads, of which the following is a specification.

My invention relates to machines for drawing in warp-threads, and particularly to a machine of this character for which Letters Patent of the United States No. 461,613 were granted to me on the 20th day of October, A. D. 1891; and my invention consists, first, in certain improvements in the mechanism for selecting the warp-threads and placing them one by one in the path of the reciprocating needle; secondly, in certain devices for holding the warp-threads while being acted upon one at a time by the selecting-hook and keeping them parallel in a single row, whereby they are prevented from riding over each other; and, finally, in certain novel devices and combinations of parts, as hereinafter more particularly set forth, and specifically pointed out in the claims.

Figure 15:
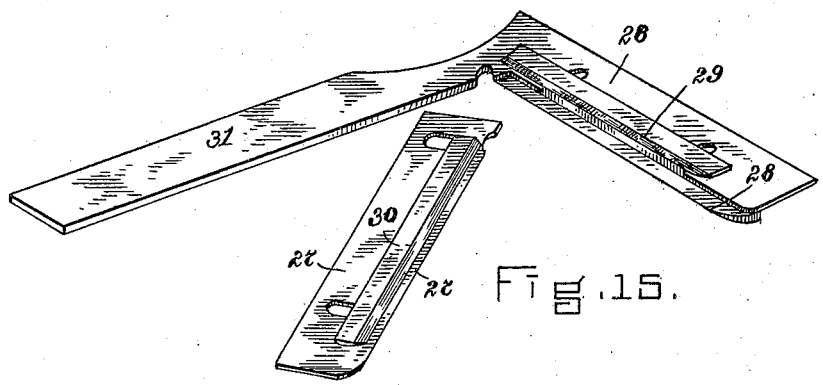
Figure 16:
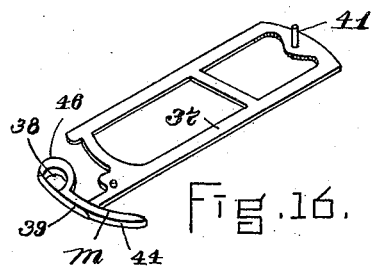
Figure 17:
Figure 18:
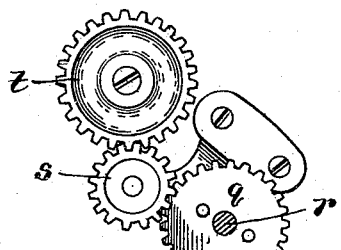

In the accompanying drawings, Figure 1 is a rear elevation of a machine for drawing in warp-threads, embodying my improvements. Fig. 2 is a side elevation of the same. Fig. 3 is an enlarged vertical section of the upper portion of the machine on the line $xx$ of Fig. 1, looking in the direction of the arrow. Fig. 4 is a side elevation of the warp-thread-selecting device and the standard or frame for supporting the same. Fig. 5 is a plan of the warp-thread-selecting device with the bearing-edges separated, the warp-drawing needle having just caught a thread and being in the act of pulling it through the eye of the selecting-hook and out from the lower and intermediate clamping devices. Fig. 6 is a plan of the selecting device shown in Fig. 5, the rotary disk which carries the selecting-hook being shown in dotted lines and the operating-gears being removed. Fig. 7 is a vertical section on the line 7 7 of Fig. 5. Fig. 8 is an enlarged vertical section on the line 8 8 of Fig. 6. Fig. 9 is a similar section showing the bearing-edges advanced to lap each other. Fig. 10 is a horizontal section on the line 10 10 of Fig. 4. Fig. 11 is a horizontal section on the line 11 11 of Fig. 4. Fig. 12 is a vertical section on the line 12 12 of Fig. 4. Fig. 13 is a horizontal section on the line 13 13 of Fig. 4. Fig. 14 is a sectional detail to be referred to. Fig. 15 is a perspective view of the narrow plates which form the bearing-edges for the warp-threads. Fig. 16 is a view of the warp-thread-selecting hook and its slide detached. Fig. 17 is a vertical section of the rotary disk which carries the warp-thread-selecting hook, showing the manner in which the two parts of the disk are held together. Fig. 18 is a view of the train of spur-gears by which motion is transmitted to the eccentric gears which operate the rotary disk carrying the warp-thread-selecting hook.

The frame-work of the machine may be of any suitable construction, and in the present instance consists of a bed A, which is supported on suitable legs and is provided with guides, to which is adapted a traversing carriage or slide B, which is fed from right to left by means of a feed-screw C, driven from the main or driving shaft D of the machine through the medium of suitable gearing and other connections. (Not shown.) The shaft D is provided with the ordinary fast and loose pulleys, as shown in Fig. 1.

Between vertical end pieces or standards $b$ $b$, rising from the bed A, are secured four horizontal tubular rods $c$, upon which slide the hangers G, which support the heddles H H, the upper and lower bars of which fit within rectangular eyes or yokes at the ends of said hangers.

I is the heddle-cord-separating mechanism, and J the reed-dent-separating device, constructed and operating as fully described in my aforesaid Letters Patent No. 461,613.

K represents the reed, which is supported in a suitable frame secured to the standards $b$, and L is the warp-drawing needle, which is a flat steel bar pointed and barbed at its front end, said needle being reciprocated in a tubular casing by suitable mechanism, fully described in my aforesaid Letters Patent No. 461,613.

The warp-threads are wound upon the warp-beam M, journaled in bearings in a suitable stand on the floor, as seen in Fig. 2, and said warp-threads pass over a long guide-bar $d$, supported by suitable brackets projecting from the frame-work of the machine. Over this guide-bar is pressed an inverted-U or trough shaped spring-metal clamp e, the warp-threads being confined between the bar d and the clamp e. The lower clamping bar or device N for the warp-threads is supported by a tubular rod 100, secured at its opposite ends to suitable brackets on the frame-work, and said clamping device consists of a long stationary flat bar f and a removable clamping-bar g, the latter being held tightly in place against the face of the flat bar f by removable spring-metal clamps h, the warp-threads being confined between the two bars, and the inner side of the bar g, which presses against the warp-threads, being covered with felt, cloth, or other material to allow each thread to be easily and independently withdrawn by the needle L without disturbing any of the adjacent threads, this clamping device being substantially like that shown and described in my aforesaid Letters Patent No. 461,613.

In addition to the two clamping-bars or devices above described I employ in my present invention an intermediate or supplementary clamping bar or device P, composed of two bars 101 102, constructed and held together in the same manner as the bars of the lower clamping device N, the inner side of the bar 101 being covered with felt or cloth. This clamping device P is supported at a suitable distance above the lower clamping device and is rigidly connected therewith by means of a series of vertical connecting-bars i, extending from one to the other, as seen in Figs. 1, 2, 3, and 4, whereby, when the lower clamping device N is adjusted longitudinally by turning the hand-wheel k of the screw-shaft 155, (not shown,) connected therewith, the intermediate clamping device P will be simultaneously moved in the same direction, thus keeping the warp-threads in their proper vertical position. The mechanism by which the warp-threads 20 are successively selected and carried one at a time against the barbed needle L into a position to insure their being caught by its hook 21 as the needle is retracted, so as to be drawn thereby through the eye of the heddle and between the dents of the reed, will now be described.

Q is a standard or frame which is bolted to the carriage B, and carries at its upper end a table R, forming a part of said frame, upon which is mounted a rotary disk S, which carries the rotating sliding selecting-hook m, by means of which the warp-thread is carried against the reciprocating needle L in a manner to be particularly described hereinafter. To a central hub or projection 15 on the upper side of the disk or carrier S is secured, eccentrically, an elliptical gear n, which engages with a corresponding elliptical gear p, immovably secured eccentrically upon a spur-gear q, which revolves on a headed stud r. This gear q is driven, through the medium of an intermediate gear s, by a gear t, fast on the upper end of the vertical shaft T, driven from the main or driving shaft of the machine through the medium of suitable gears and shafts. (Not shown.)

The table R is provided with two jaws or extensions 25 26, Figs. 8 and 9, forming between them a narrow slot u, and on these extensions are placed two adjustable plates 27 28, having beveled edges, upon which plates are secured two narrow plates 29 30, also having beveled edges, four bearing-edges being thus formed upon which the warp-threads are caused to bear as they pass into the space u between the two jaws 25 26. The upper pair of bearing-edges are located just above the level of the selecting-hook m, while the lower pair of bearing-edges are located just below the level of the said hook, which, as it is rotated, passes horizontally between the inner ends of said upper and lower pairs of bearing-edges, so as to catch the portion of the warp-thread which is between the same, the inner ends of the plates 29 and 30 overlapping, and the inner ends of the plates 27 28 underlapping, said selecting-hook, as seen in Fig. 14. The plate 27, carrying the narrow plate 30, is made adjustable by means of screws w w, to enable it to be set at the required distance from the edge of the plate 28. The plate 28, which forms the movable portion of the jaw, is connected to a slide 31, moving in a guide-way in the table R, and to this slide is pivoted a lever 32, also pivoted at its opposite end to the table R, a projection 33 of this lever being acted upon by a cam-disk 34 on the shaft T, whereby the plates 29 and 28 are advanced sufficiently to cause them to respectively overlap and underlap the plates 30 and 27, which movement causes the plates 28 and 29 to press the warp-threads out of a straight line and cause them to bear against the edges 27 and 30, as well as the edges 28 and 29, as seen in Figs. 8 and 9, the two clamping devices N P readily permitting the threads to be drawn out as they are pressed out of a vertical line by the said bearing-edges. By thus causing the warp-threads to be tightly stretched over four bearing-edges, as described, they are kept parallel or side by side without liability of riding over each other as the table R is fed forward with the carriage B, and at the same time these warp-threads are held tightly in place above and below the selecting-hook simply by their friction against the said bearing-edges and without being clamped between the same, and the said threads are thus held firmly in position while being caught by the selecting-hook m. The warp-threads are, however, still further held tightly in place while being acted upon by the selecting-hook by the intermediate or supplementary clamping device P, before described, which is located, as seen in Figs. 3 and 4, a short distance only below the level of the selecting-hook, and serves to support the threads and prevent them from becoming slack at this point, and also prevents said threads from being jarred and thrown out of line by the concussion produced by the descent of the nippers W, to be hereinafter described, and their carrying slide.

The disk or carrier S is made in two pieces held together by screws, as seen in Fig. 17, the under and smaller portion of which fits and rotates within a circular recess in the table R, the disk rotating upon a stud 36, the head of which rests upon the hub 15 of the disk S and fits within a recess formed for its reception in the under side of the elliptical gear $n$, which is securely fastened, as before described, to the hub 15 of the disk eccentrically with respect to the center thereof. Within a shallow groove in the lower portion of the disk S is fitted a slide 37, which is provided at one end with a hook-shaped portion forming the warp-thread-selecting-hook $m$, within which is formed an eye or aperture 38 upon its outer side, said opening being closed by a light spring 39, the free end of which extends beyond the eye and lies against the edge of the hook $m$ in such manner as to permit the entrance of a single thread only at a time into the eye 38 as the hook $m$ is carried by the rotation of the disk S past the line of warp-threads stretched over the four bearing-edges 27, 28, 29, and 30, before described. The selecting-hook $m$ is forced out beyond the periphery of the disk S by a light flat spring 40, and at the end of the slide opposite to the hook $m$ is a pin 41, which projects up through a slot in the disk, and during a portion of the rotation of said disk rides over the edge of a cam-plate 42, by which means the slide 37 is retracted against the influence of the spring 40. When, however, the point of the hook $m$ reaches the warp-threads the pin 41 rides down an incline 43 at the end of the cam-plate 42, which permits the slide 37 to be forced outward by the spring 40, causing the inclined side 44 of the hook $m$ to bear against the foremost warp-thread, producing a tension thereon, which thus insures the thread passing into the eye of the said selecting-hook. The single thread thus selected and separated from the series is then carried by the selecting-hook along the guide-rod $a'$ and against the lower edge of the needle L, which has by this time completed its outward movement, and into a position, as before described, to insure its being caught by the hook or barb of the needle, as seen in Fig. 6, which as it is retracted carries the thread back through the eye of the heddle and through the reed.

The eye or aperture 38 of the selecting-hook is placed near to its corner 46, thus leaving the least possible portion of metal projecting behind it compatible with strength, and this corner 46 is rounded off, as seen in Figs. 5 and 6, the advantage of this construction being that there is no angular projecting portion left behind the eye to come into contact with the thread immediately following that which has been caught by the hook, and consequently all liability is avoided of its being struck and thrown out of position by the rear end of the selecting-hook as the latter is carried past it.

Just before the reciprocating needle L commences to draw back the warp-thread the plates 28 and 29 are drawn back from the opposite plates 27 and 30, thus relieving the strain upon the warp-threads produced by the bearing-edges, and leaving these plates in a position to permit of the free entrance between their front ends of the line of warp-threads as the table R is fed forward with the carriage B.

It is obvious that the best results can be attained by causing the selecting-hook to move slowly at the time it is taking a warp-thread, as the liability of its skipping or taking more than one thread at a time is thus avoided, and that after the thread has passed into the eye a quick motion to compensate for the time thus lost is necessary to cause the selecting-hook to complete its revolution within the required time. This I attain by rotating the selecting-hook $m$ at a variable speed through the medium of elliptical gears, as before described, these gears being so arranged as to cause the disk S to move slowly at the time the selecting-hook is operating upon or catching a warp-thread, while as soon as said thread has been caught by the hook the speed of the latter is quickened to make up for the time lost in reducing its speed before catching the thread, the motion being so regulated that the complete revolution of the selecting-hook will be effected in the exact time required to bring it again into the position to catch the next thread at the proper moment, no actual loss of time resulting from the reduction of speed of the hook, as it completes its revolution in the same time as would be the case if it were rotated at a uniform speed by means of ordinary circular gears.

Beneath the bearing-plates 27, 28, 29, and 30 are a pair of horizontal nippers W, which have a vertical movement toward and from said bearing-plates and are alternately opened and closed, so as to take up any slack in the warp-threads as they are presented to the selecting device. The jaws of these nippers are both mounted upon a slide 50, moving in vertical guideways on a side extension of the standard Q, said jaws being pivoted at 51 52 and connected by a link 53, Fig. 13, whereby the motion of one is communicated to the other to cause them to move simultaneously in opposite directions. The slide 50 is moved by a cam 54 on a short shaft 55, to which is secured a beveled wheel 56, which meshes with a beveled wheel 57 on the shaft T, said cam acting on an anti-friction roll on the lower end of an arm 58, projecting down from the slide 50, a spring 59 serving to retract the slide after it has been raised by the cam. The nippers W are opened against the influence of a spring 60 by a wing or plate 61, projecting from a vertical rod 62, passing up between the nippers and supported at its opposite ends in suitable bearings. This rod 62 is partially rotated on its axis to cause the wing 61 to act upon and open the nippers by a cam 64 on the short shaft 55, which is brought into contact with a pin 65 on the shaft 62, and as soon as this pin drops off the projection of the cam the rod is returned to its normal position by a spring 67, which encircles said rod. These nippers are similar in construction and mode of operation to those described in my aforesaid Letters Patent No. 461,613, serving in the same manner to stretch and take up any slack in the warp-threads before the latter are presented to the selecting device, and form no part of my present invention.

The two bars 101 102, which form the intermediate clamping device P, are kept tightly together at the point where the threads are being taken by the selecting-hook by the pressure thereon of two anti-friction guide-rollers $b'$ $c'$ on the table R and standard Q, the guide-roller $b'$ being mounted upon a stationary stud secured to the under side of the table R, and being adapted to bear against the inner edge of the inner bar 102, while the guide-roller $c'$ bears against the outer side of the outer bar 101. This latter roller $c'$ is mounted in the outer end of a swinging frame $e'$, pivoted at $f'$ to the standard Q. This frame $e'$ takes a bearing upon the outer leaf of a spring $g'$, secured to the standard Q, which spring forms a yielding rest therefor and serves to keep the roll at all times firmly against the said clamping-bar with a yielding pressure, and in this manner the two bars of the intermediate clamping device are kept at all times firmly in contact with each other in order to maintain the desired tension upon the warp-threads close to the point where they are being drawn out by the selecting-hook, so that each thread can be easily and independently withdrawn by the needle L without disturbing or slackening any of the adjacent threads.

The outer side of the outer bar of the lower clamping device N bears against an anti-friction guide-roller $d'$, which is mounted in a frame $n'$, similar to the frame $e'$, and likewise resting against a spring $i'$, similar to the spring $g'$, this roll serving to keep the two bars of the lower friction device closely together, as required, the inner bar being stiffened and prevented from springing by the tubular rod 100, by which it is supported. These springs $g'$ $i'$ are each provided with an adjusting-screw $h'$, by means of which the pressure of the guide-rollers upon the bars of the clamping devices may be regulated, as desired.

What I claim as my invention, and desire to secure by Letters Patent, is—

1. In a warp-drawing machine, the combination, with the warp-drawing needle, of a warp-thread-selecting hook and elliptical gearing for rotating the same at variable speed, substantially as and for the purpose set forth.

2. In a warp-drawing machine, the combination, with the warp-drawing needle, of a warp-thread-selecting hook mounted upon a disk or carrier and elliptical gearing for rotating the same at variable speed, substantially as described.

3. In a warp-drawing machine, the combination, with the warp-drawing needle, of a horizontally-rotating disk or carrier, a slide moving horizontally in said disk or carrier and provided at its outer end with a warp-thread-selecting hook, having an inclined face and an eye, a light spring covering said eye, means for projecting the slide to cause the selecting-hook to take a single warp-thread and afterward retracting said slide, and elliptical gears for rotating the disk or carrier and selecting-hook at variable speed, substantially as and for the purpose set forth.

4. In a warp-drawing machine, the combination, with the warp-drawing needle and the rotating disk or carrier, of the slide 37, carrying at one end the selecting-hook $m$, provided with an eye or aperture 38, and a light spring for closing one side of said aperture, said selecting-hook having that portion immediately in the rear of the eye rounded to avoid contact with the warp-thread immediately following that which has passed into the eye, substantially as set forth.

5. In a warp-drawing machine, the combination, with the warp-thread-selecting hook, of a pair of plates having bearing-edges arranged to pass one over the other, whereby the warp-threads are drawn out of a straight line and caused to bear upon and be stretched over said edges without being clamped between the same, substantially as set forth.

6. In a warp-drawing machine, the combination, with the warp-thread-selecting hook, of a pair of jaws provided with an upper and a lower pair of bearing-edges, the former located above and the latter below the path of the selecting-hook, which passes horizontally between the inner ends of the said upper and lower pairs of bearing-edges, the two bearing-edges of a pair being arranged to pass one over the other, whereby the warp-threads are drawn out of a straight line and caused to bear upon and be stretched over said four bearing-edges, two above and two below the path of the selecting-hook at the time the latter is taking a thread and without being clamped between said bearing-edges, substantially as described.

7. In a warp-drawing machine, the combination, with the warp-thread-selecting devices, the nippers W, and the upper and lower warp-thread-clamping bars, of an intermediate or supplementary clamping bar or device connected to and adapted to move with the lower clamping-bar when the latter is adjusted, whereby the warp-threads are kept in a vertical position, said intermediate clamping-bar being located below and near the level of the warp-thread-selecting hook, whereby the warp-threads are prevented from being jarred and thrown out of line by the concussion produced by the descent of the nippers W and their carrying-slide, substantially as described.

8. In a warp-drawing machine, the combination, with a warp-thread-selecting device, the nippers, and the upper and lower warp-thread-clamping bars, of the intermediate clamping device P, consisting of an outer bar 101 and an inner bar 102, the latter connected with the lower clamping device N by means of vertical connecting pieces or bars, substantially as described.

9. In a warp-drawing machine, the combination, with the intermediate warp-thread-clamping device consisting of two bars between which the threads are held, of the traversing frame or standard carrying the warp-thread-selecting device and provided with anti-friction guide-rollers adapted to bear upon the inner and outer bars of said intermediate clamping device near the point where the threads are being taken by the selecting-hook, whereby said threads are kept at the required tension, substantially as set forth.

10. In a warp-drawing machine, the combination, with the intermediate and lower warp-thread-clamping devices, of the traversing frame or standard provided with the inner anti-friction guide-roller $b'$, mounted upon a stationary stud, and the outer anti-friction guide-rollers $c'\,d'$, mounted in movable frames, springs forming yielding rests for said movable frames, and adjusting-screws bearing upon said springs, whereby the pressure of the guide-rollers upon the said clamping devices may be varied, substantially as set forth.

Witness my hand this 2d day of February, A. D. 1891.

RICHMOND H. INGERSOLL.

In presence of—
P. E. TESCHEMACHER,
HARRY W. AIKEN.